United States Patent
Beverly et al.

(10) Patent No.: US 9,450,855 B2
(45) Date of Patent: *Sep. 20, 2016

(54) MESSAGE ROUTING MECHANISM FOR COMMUNICATION NETWORKS

(75) Inventors: Harlan T. Beverly, McDade, TX (US); J. Michael Welsh, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 13/612,380

(22) Filed: Sep. 12, 2012

(65) Prior Publication Data

US 2013/0003734 A1    Jan. 3, 2013

Related U.S. Application Data

(63) Continuation of application No. 12/533,530, filed on Jul. 31, 2009, now Pat. No. 8,289,867.

(60) Provisional application No. 61/085,609, filed on Aug. 1, 2008.

(51) Int. Cl.
*H04L 12/701* (2013.01)
*H04L 12/725* (2013.01)

(52) U.S. Cl.
CPC ............. *H04L 45/00* (2013.01); *H04L 45/306* (2013.01)

(58) Field of Classification Search
CPC ..... H04L 45/306; H04L 45/00; H04L 12/18; H04L 12/1836; H04L 12/1886; H04L 69/329; H04L 45/16; H04L 45/30; H04L 67/327
See application file for complete search history.

(56) References Cited

U.S. PATENT DOCUMENTS

| | | |
|---|---|---|
| 6,366,568 B1 | 4/2002 | Bolgiano et al. |
| 6,438,561 B1 | 8/2002 | Israni et al. |
| 6,901,051 B1 | 5/2005 | Hou et al. |
| 2002/0118723 A1 | 8/2002 | McCrady et al. |
| 2005/0041674 A1 | 2/2005 | Rooney |
| 2008/0009268 A1 | 1/2008 | Ramer et al. |
| 2008/0101368 A1 | 5/2008 | Weinman |
| 2009/0028047 A1* | 1/2009 | Schmidt et al. ............ 370/235 |

(Continued)

FOREIGN PATENT DOCUMENTS

WO    2007023467 A2    3/2007

OTHER PUBLICATIONS

International Search Report for PCT/US2009/052400 dated Jan. 28, 2010, 5 pages.
"U.S. Appl. No. 12/533,530 Final Office Action", Dec. 29, 2011, 25 pages.

(Continued)

*Primary Examiner* — Yee Lam
(74) *Attorney, Agent, or Firm* — DeLizio Law, PLLC

(57) ABSTRACT

A message routing method includes receiving a plurality of messages at a routing node. The routing node is configured to receive instructions indicating an offset, criteria associated with the offset, and a group of interested nodes. The routing node examines a portion of a data payload of a received message based on the offset. If the information at the offset matches the criteria, the routing node routes the message to each of the group of interested nodes. Thus, the routing node can route messages to different groups of destination nodes depending on information in the data payload of received messages, thereby providing a flexible way to route messages over a network.

32 Claims, 10 Drawing Sheets

(56) References Cited

U.S. PATENT DOCUMENTS

2009/0254960 A1* 10/2009 Yarom et al. ............... 725/115
2010/0027539 A1 2/2010 Beverly et al.

OTHER PUBLICATIONS

"U.S. Appl. No. 12/533,530 Office Action", Jul. 15, 2011, 23 pages.

* cited by examiner

MESSAGE ROUTING MECHANISM FOR COMMUNICATION NETWORKS

RELATED APPLICATIONS

This application is a continuation of U.S. application Ser. No. 12/533,530 filed on Jul. 31, 2009, which claims priority to U.S. Provisional Patent Application No. 61/085,609 filed on Aug. 1, 2008.

BACKGROUND

1. Field of the Disclosure

The present disclosure relates to communication between nodes, and more particularly to communication between electronic devices.

2. Description of the Related Art

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communication networks.

In recent years, several applications have been developed that rely on timely and effective interactions between two or more elements of a communication network. For example, an online banking server, or host, may interact with hundreds or thousands of client computers via the communication network. With such an architecture, the networked host computer is frequently tasked with providing content to clients, receiving client requests, processing those requests, and responding to those requests, and synchronizing those requests with the requests of other clients. However, a large number of communications between client and host, or between peers in a peer-to-peer network can be difficult to communicate over a network in an efficient manner, undesirably slowing communications.

BRIEF DESCRIPTION OF THE DRAWINGS

The present disclosure may be better understood, and its numerous features and advantages made apparent to those skilled in the art by referencing the accompanying drawings.

DESCRIPTION OF EMBODIMENT(S)

A message routing method includes receiving a plurality of messages at a routing node. The routing node is configured to receive instructions indicating an offset, criteria associated with the offset, and a group of interested nodes. The routing node examines a portion of a data payload of a received message based on the offset. If the information at the offset matches the criteria, the routing node routes the message to each of the group of interested nodes. Thus, the routing node can route messages to different groups of destination nodes depending on information in the data payload of received messages, thereby providing a flexible way to route messages over a network.

Figure 1:
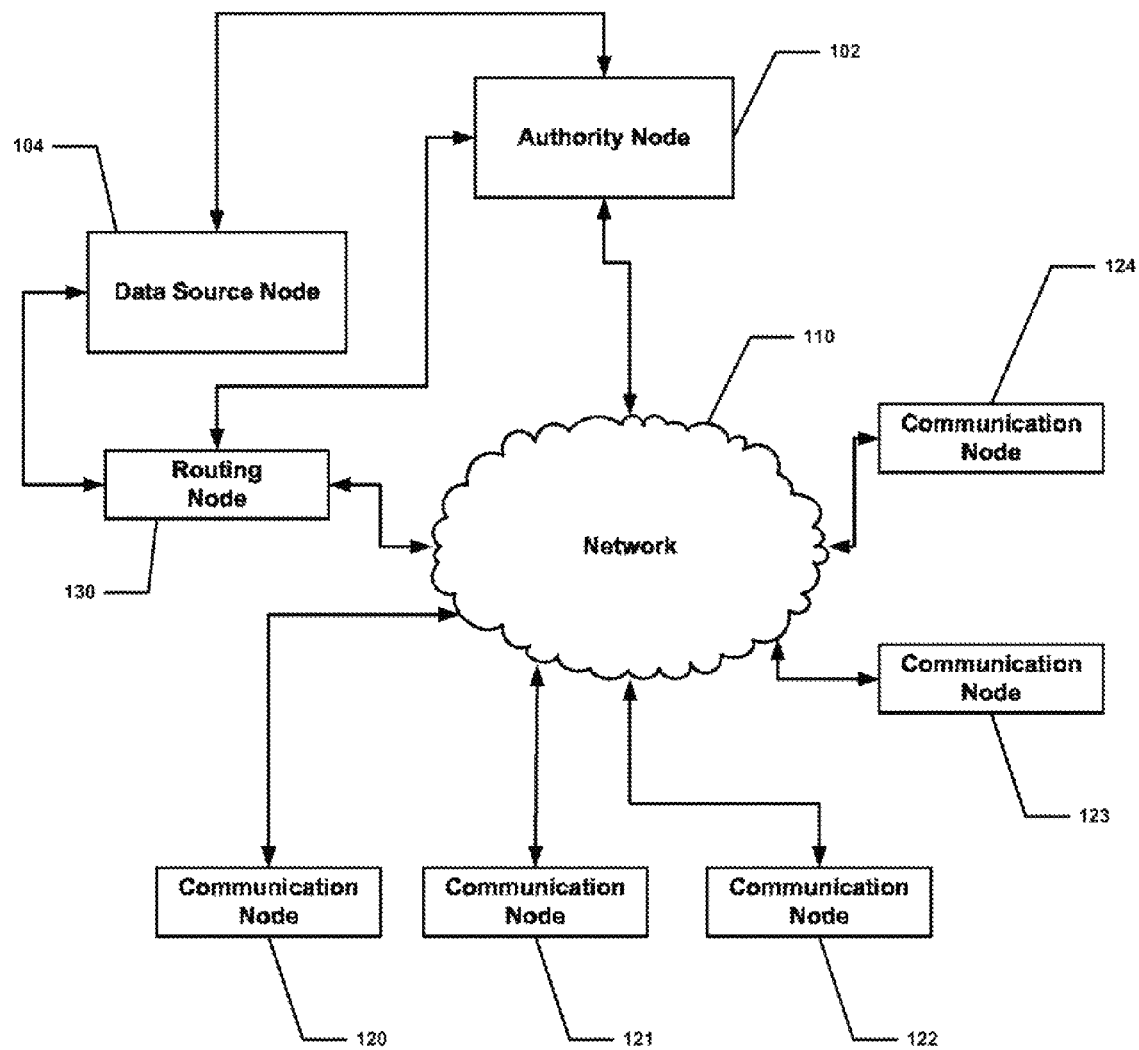
FIG. 1 is a block diagram of a communications network in accordance with one embodiment of the present disclosure.

Referring to FIG. 1, a block diagram of a particular embodiment of a communications network 100 is illustrated. The communications network 100 includes an authority node 102, a data source node 104, a routing node 130, and communication nodes 120-124. The authority node 102, routing node 130, and communication nodes 120-124 are each connected to a network 110. In addition, the data source node 104 is connected to the authority node 102 and is also connected to the routing node 130. The authority node 102 is further connected to the routing node 130. As used herein a node refers to an electronic device in a network that is able to receive, transmit, or route a communication message. Nodes are also referred to herein as communication nodes.

For purposes of discussion herein, communication nodes are generally classified into one or more of several types, including authority nodes, data source nodes, routing nodes, and interested nodes (also referred to as destination nodes). As used herein, an authority node is a communication node configured to establish message routing rules based on requests from a data source node. As used herein, a data source node is communication node configured to generate messages for communication to other nodes. A message refers to a unit of information designated for communication to another node or nodes, and can typically be divided into data segments for communication via the physical layer of the network being used for communication. Thus, a message can be divided into multiple packets for communication via a packet-switched network. A routing node refers to a communication node that is configured to receive messages from other communication nodes, and route the received messages to one or more nodes based on one or more message routing rules. A routing node is distinguished from a simple routing device, such as a conventional router, in that the routing node is able to determine the message type and route the message to more than one destination node based on the message type. In addition, the routing node can be configured to route the message based on any portion of a received message, including a portion of the data payload of a message. A router device, in contrast, routes a packet (which may be associated with a message) based on a packet address at a fixed location of the packet. An interested node refers to a communication node that is one of the targeted destinations of a message.

It will be appreciated that a particular communication node can be associated with more than one type of node. Thus, for example, a single communication node can be an authority node, a data source node, a routing node, an interested node, or any combination thereof. Moreover, although for purposes of discussion the communication nodes of FIG. 1 are illustrated as being of a particular node type, it will be appreciated that any of the illustrated nodes could also be associated with other types of communication nodes. Thus, for example, authority node 102 could also be a routing node, or a data source node, or an interested node, or any combination thereof.

It will further be appreciated that nodes can be associated with different types of electronic devices. For example, communication network 100 can be associated with a wide area network configuration, where network 110 represents the Internet or other wide area network. In this configuration, the authority node 102 and data source node 104 can be located at a server device, and communication nodes 120-124 can represent separate client devices, such as desktop computers, portable computers, cell phones, and the like. In another embodiment, communication network 100 can represent a communication network internal to an electronic device, where network 110 is a communication bus. In such an embodiment, the authority node 102 can be a data processor device, and communication nodes 120-124 can represent additional processor devices, peripheral devices, memory devices, and the like. For purposes of discussion herein, it is assumed that network 110 is a wide-area packet-switched network, such as the Internet.

In operation, data source node 104 can send a request to authority node 104 to establish node 104 as a data source node. This request may optionally contain a set of types of messages that the data source node is requesting to be able to generate. In response, authority node 104 can determine if the request is authorized, according to a set of authorization rules (such as password authentication or other security procedure). If the request is authorized, authority node 102 determines a set of message routing rules, based on the types of messages to be communicated by data source node 104 or based on the types of messages requested by the data source node 104. For example, authority node 102 can determine that data source node will be communicating three types of messages, and establish message routing rules for each type of message. The authority node 102 can also determine when a new interested node should be added to a designated routing group, and modify the message routing rules accordingly.

Authority node 102 communicates the message routing rules to the routing node 130. The message routing rules, as a whole, indicate the type of messages to be communicated and the interested nodes associated with each group. The routing node 130 can determine the message type by inspecting, via Deep Packet Inspection or other technique, the data payload of a packet associated with the message. In addition, in a particular embodiment, the message type refers to a characteristic of the message, such as an intended use of the message or a type of data being communicated by the message, that is different and distinct from a target or source address of packets associated with the message. This allows the routing node 130 to route messages (and their associated packets) based on criteria other than a particular address assigned by the data source node.

The authority node 102 can communicate the message routing rules to the routing node 130 using one or more control messages. For example, the authority node can communicate an ADD_CONNECTION_TO_GROUP message, an ADD_MESSAGE_ROUTING_RULE_TO_GROUP message, a REMOVE_CONNECTION_FROM_GROUP message, a REMOVE_MESSAGE_ROUTING_RULE_TO_GROUP message. In a particular embodiment, each node defines a connection based on an Internet Protocol (IP) address and port number. In response to the ADD_CONNECTION_TO_GROUP message, the node will add an interested node to a group associated with one or more routing rules. In response to an ADD_MESSAGE_ROUTING_RULE_TO_GROUP message, the node will associate the group with a particular routing rule. The routing rule indicates what type of message gets sent to nodes in the group. In an embodiment, each message routing rule can indicate an offset, a size, and a value to which a portion of the data payload of received messages will be compared in order to determine if the message should be sent to the associated group. In an embodiment, an ADD_MESSAGE_ROUTING_RULE_TO_GROUP message specifies the offset, size, value, and group with which the rule is associated. Thus, each group is associated with a particular message type, and indicates the interested nodes to which messages of that type should be communicated. The REMOVE_CONNECTION_FROM_GROUP message, and REMOVE_MESSAGE_ROUTING_RULE_TO_GROUP message remove a connection and a routing rule, respectively, from a designated group. It will be appreciated that a connection can be associated with more than one group. Thus, an interested node can belong to multiple groups, so that messages a routed to the interested node based on the routing criteria associated with each group.

In response to receiving a message, the routing node 130 checks the offset, size, and value of the message, and based on this determination communicates the message to the interested nodes indicated by the associated group. It will be appreciated each group can indicate more than one interested node, so a particular message can be communicated to one or more interested nodes. For example, if a group includes connections indicating two different nodes, each received message associated with that group (i.e. each message of the message type associated with the group) will be communicated to each node in the group. The routing node 130 can determine an address, such as an IPv4 or other IP address, for each interested node, form packets including the message content addressed to each interested node, and route the packets to the interested nodes via the network 110. The routing node 130 thus provides an interface that allows the conventional network 110 to be employed to route packets to multiple interested nodes based on the type of received message.

Further, by using the authority node 102 to establish the message routing rules, the design of data source node 104 can be simplified. In particular, different data source nodes can communicate with authority node 102, which can establish message routing rules at the network 110 for different message types from each data source node. The establishment of message routing rules is thus abstracted from the data source nodes and the routing nodes, simplifying the design and operation of each node. In addition, it can reduce the communication bandwidth of the data source node 104 because the data source node does not itself have to communicate each message to each destination node. Moreover, by locating the routing nodes closer to the interested nodes, message communication latency can be reduced. Further, by including multiple routing nodes in the communication network 110, the network load can be distributed more efficiently throughout the network, reducing latency.

Figure 2:
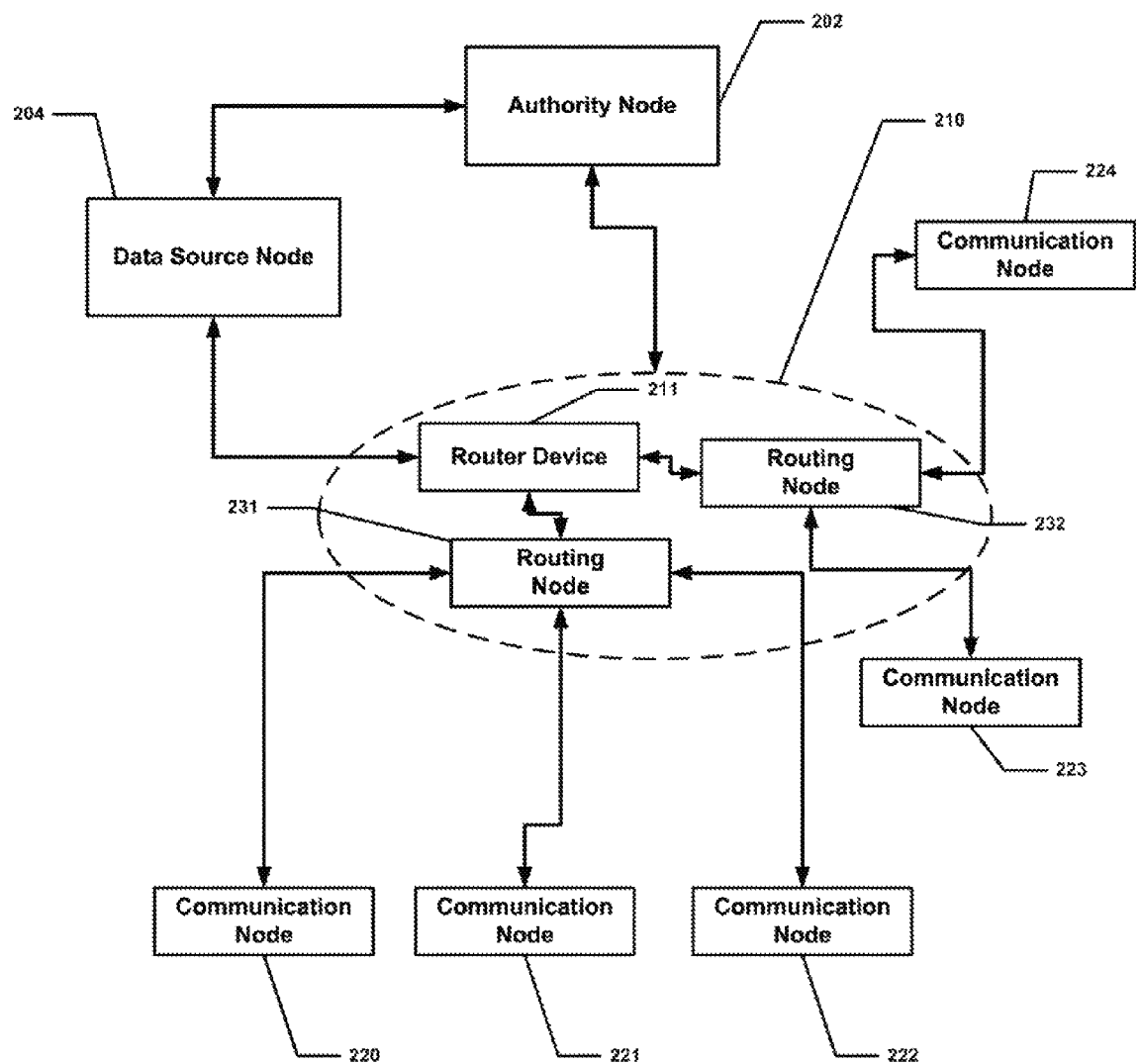
FIG. 2 is a block diagram illustrating a particular embodiment of the communications network of FIG. 1.

FIG. 2 illustrates a particular embodiment of a communications network 200. Communications network 200 includes authority node 202, data source node 204, a network 210, and communication nodes 220-224, each of which are configured similarly to the corresponding portions of communication network 100. In addition, in the illustrated embodiment of FIG. 2, the network 210 includes a router device 211 and routing nodes 231 and 232.

In the illustrated example of FIG. 2, it is assumed that data source node 204 has associated communication nodes 220-222 with a first group, designated Group A, and has associated communication nodes 223 and 224 with a second group, designated Group B. For example, data source node 204 can be a web server program that has determined nodes 220-222 should be provided with a first web page, while communication nodes 223 and 224 should be provided with a second, different web page. Accordingly, data source node 204 requests authority node 202 to establish node 204 as a data source node. In response, authority node 202 determines a set of message routing rules for each type of message associated with data source node 204. In particular, messages targeted to Group A are of a different type than messages targeted to Group B. Accordingly, authority node determines a set of message routing rules so that messages targeted to Group A (referred to as A-type messages) will be routed to communication nodes 220-222, and determines a set of message routing rules so that messages targeted to Group B (referred to as B-type messages) will be communicated to communication node 234 and communication node 235.

In response to determining the message routing rules, the authority node 202 communicates the message routing rules to routing nodes 231 and 232. In addition, authority node 202 communicates an address, such as an IP address, of each of the routing nodes 231 and 232 to data source node 204. The data source node 204 is configured to form one or more packets for each message to be communicated, with each packet including the address of the associated routing node, and provides each packet to the router device 211 for routing. Router device 211 is a conventional router device that does not route the received packets based a portion of the content of the data payload of the message, but instead routes each packet based on the associated address. In an embodiment, the router device 211 is a unicast router device that is configured to route each packet to the associated unicast address. It will be appreciated that the network 210 can include additional router devices between each of the illustrated nodes. For example, additional router devices can be placed between the routing nodes 231 and 232 and the associated communication nodes. The routing nodes 231 and 232 can thus employ the router devices to route messages to interested nodes.

Data source node 204 communicates both A-type and B-type messages are communicated to router device 211, which routes the messages to one of routing nodes 231 or 232 based on the address of the packets associated with each message. Authority node 202 communicates message routing rules to routing node 231 so that all A-type messages are routed to each of communication nodes 220-222. In addition, authority node 202 communicates message routing rules to routing node 232 so that all B-type messages are communicated to routing nodes 223 and 224. Thus, data source node 204 does not have to determine the routing path for A-type message and B-type messages, but instead can rely on the message routing rules established by authority node 202 to handle message routing. This simplifies the design of data source node 204, improving communication efficiency.

Further, the routing nodes 231 and 232 are able to employ the routing devices that form the backbone of the network 210 to communicate messages. In an embodiment, the routing node 231 establishes a one-to-one connection with each of the communication nodes 220-222. As used herein, a one-to-one connection is a connection established based on an address of the destination node that is unique with respect to addresses of other destination nodes. By establishing one-to-one connections, the routing node 231 is able to route messages using one or more unicast routers, allowing messages to be routed to multiple destinations based on message type, without extensive redesign of the network 210.

In an embodiment, routing node 232 can generate one or more copies of a single received message in order to route the message to multiple other nodes, such as other routing nodes or interested nodes. For example, routing node 232 can receive a single message, and determine based on the message routing rules that the message is a B-type message to be communicated to routing nodes 223 and 224. In response, routing node 232 copies the received message in order to route a copy of the message to each of routing nodes 223 and 224.

Figure 3:
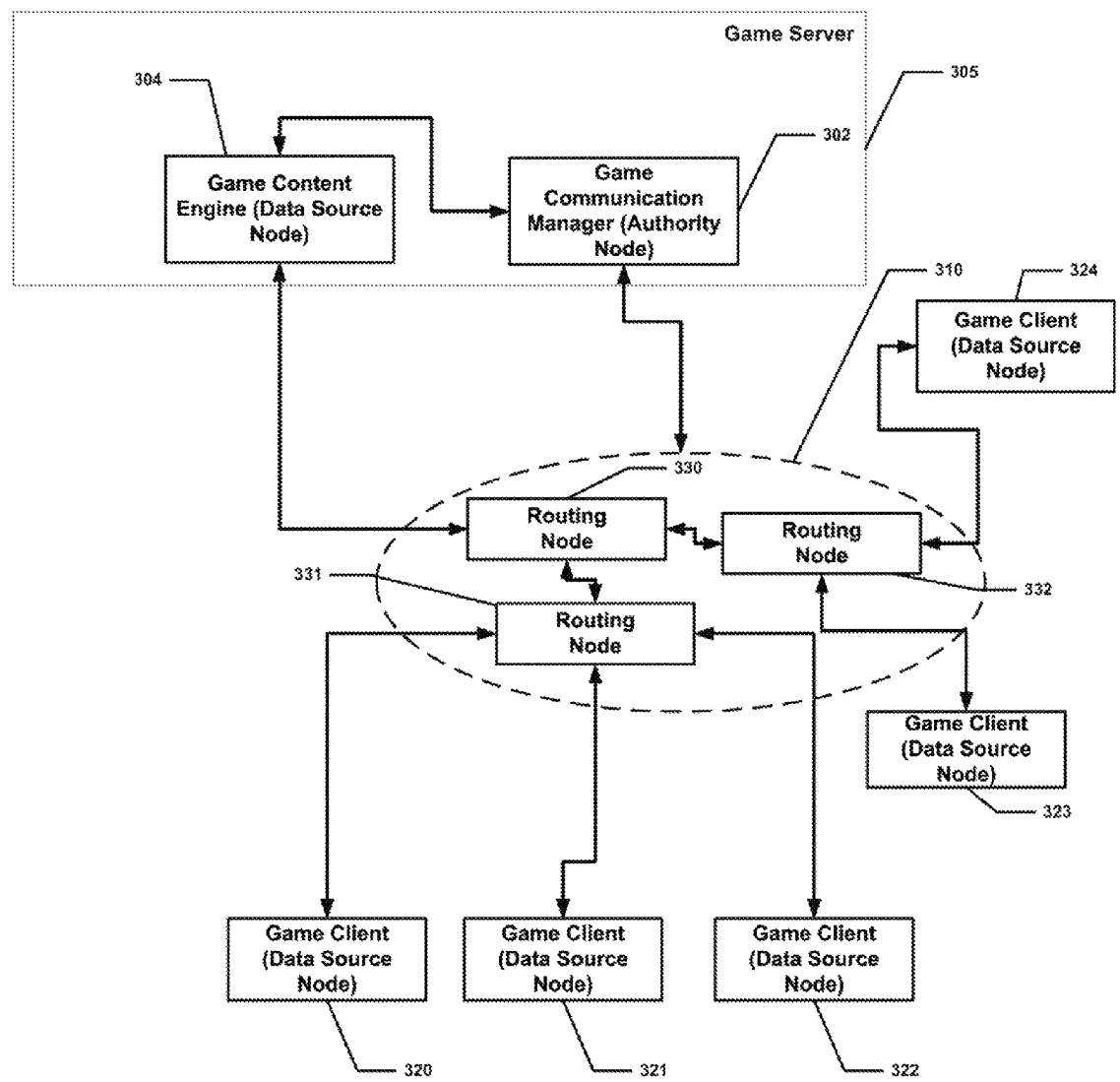
FIG. 3 is a block diagram of a communications network implementing a network game in accordance with one embodiment of the present disclosure.

Referring to FIG. 3, a block diagram of a communication network 300 implementing a network game is illustrated. Communication network 300 includes a server 305 and game clients 320-324 (which can also be game peers in a peer-to-peer network), each connected to a network 310 having routing nodes 330-332. Game server 304 includes a game content engine 304, which is configured as a data source node, and a game communication manger 302, which is configured as an authority node.

In operation, the game content engine 304 is configured to provide game content information for a network game, such as multiplayer online game (MOG), to game programs operating at game clients 320-324. In the illustrated embodiment, game clients 320-322 are assumed to be associated with a first group, designated Group A, while game clients 323 and 324 are associate with a second game group, designated Group B. The grouping of game clients can be based on one or more predetermined or dynamic criteria. For example, Group A and Group B may each be associated with participants of different player-vs.-player game sessions. In another embodiment, Group A may be associated with players in a first game region, while Group B is associated with players in a second game region. It will be appreciated that each game client or game peer can be a member of more than one group. Further, any arbitrary grouping can be employed for each type of message, so that two game clients or game peers can be in a first group for a first type of message and in two different groups for a second type of message.

Game communication manager 302 establishes, in response to request from game content engine 304, message routing rules for different message types associated with each group. Thus, messages associated with Group A (referred to as A-type messages) are routed, based on the message routing rules, to each of game clients 320-322, while messages associated with Group B (referred to as B-type messages, are routed to each of game clients 323 and 324. Because routing of types of messages is handled by the message routing rules, rather than by the game content engine determining a unique address for each targeted recipient of a message, the game content engine 304 is simplified and communications can occur more efficiently.

In addition, it will be appreciated that each game program and game client can act as a data source and routing node. This can be better understood with reference to FIG. 4, which illustrates a communication network 400. The communication network 400 includes a server 405, and game clients 420-424, each connected to a network 410. The game server 405 includes a server game program that is configured as a data source and authority node. Game client 420 includes a network interface 441 and a game program 442. The network interface 441 is a network interface card, processor, or other hardware module configured to interface with the network 410. The game program 442 is a program executing at a processor to interact with the server game program in order to provide a game experience to a user. The game program 442 can be executed at a different processor or other hardware module from the network interface 441. Game clients 421-424 can each be configured similarly to game client 420.

Figure 4:
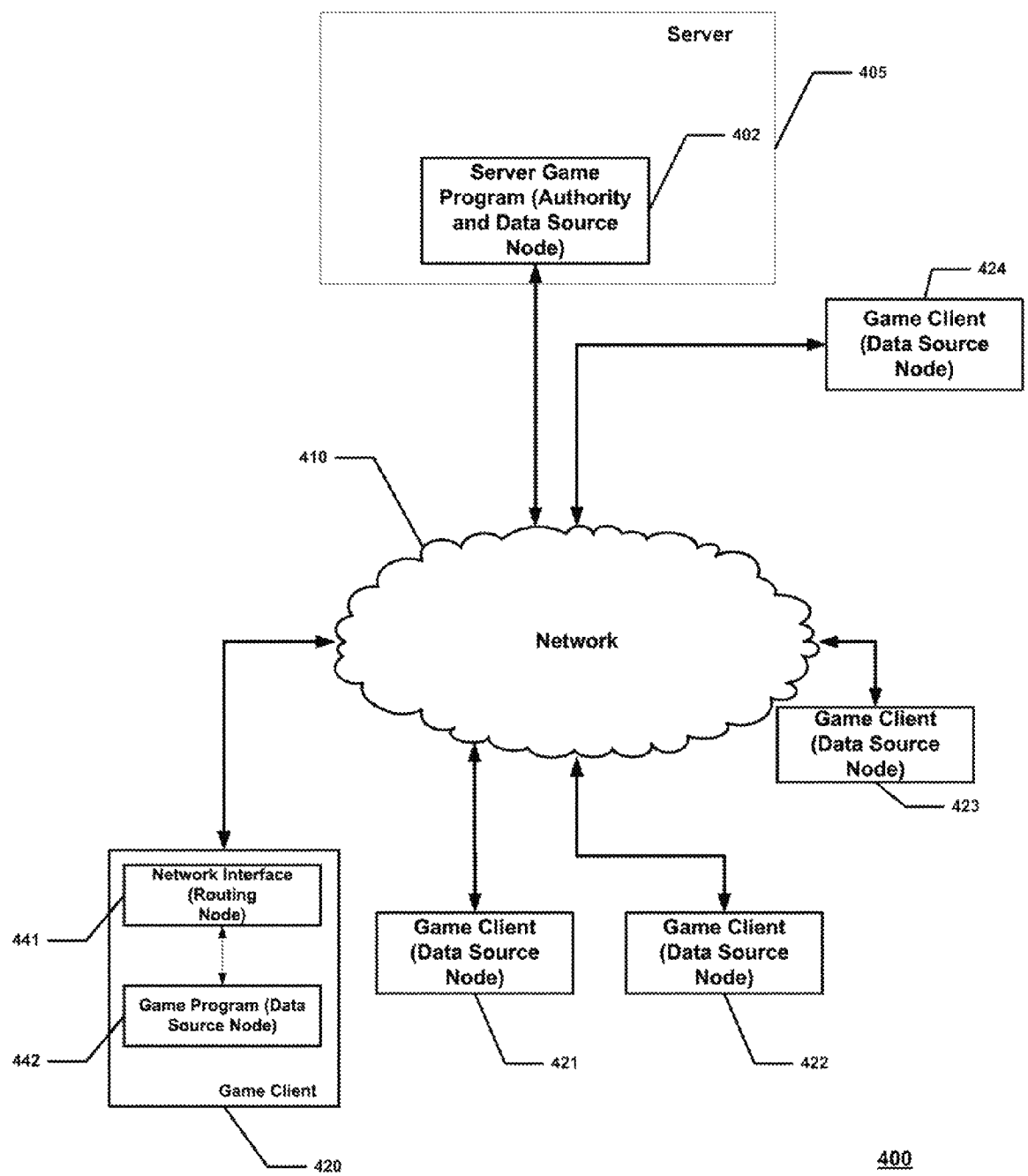
FIG. 4 is a block diagram of a particular embodiment of the communications network of FIG. 3.

In the illustrated embodiment of FIG. 4, the network interface 441 can be configured as a routing node. In particular, network interface 441 can communicate a request to server game program 402 to be configured as a routing node. In response, server game program 402 can communicate message routing rules to the network interface 441 so that messages of different types can be routed to different destination nodes. In a particular embodiment, network interface 441 can employ the message routing rules to route messages directly to other game clients without sending the message through the server game program 402. For example, network interface 441 can receive a message from game program 442, indicating the user has interacted with the game in a particular way. The message payload will include information that indicates a particular message type. Based on the message routing rules, the message type indicates a group of game clients associated with the message, the type of interaction represented by the message, and the like. Based on the message type, the network interface 441 can route the message to another game client via the network 410 without routing the message via the server game program 402. The network interface 441 can thus establish a peer-to-peer connection between the game client 420 and each interested node for messages of a first message type, while establishing a client-server connection between the game client 420 and the server 405 for messages of a second message type. As used herein, a peer-to-peer connection refers to a connection between communication nodes where messages are routed between the nodes without routing the messages to a designated central server or set of servers for processing. A client-server connection refers to a connection where messages are routed to a designated server or set of servers for processing.

For example, if network interface 441 receives a message associated with Group A, which includes game client 421 and game client 422, network interface 441 can route a copy of the message to game client 421 and a copy of the message to game client 422, without routing the message copies through server game program 402. This allows game interactions to be communicated to the appropriate groups in a peer-to-peer fashion, without direct interaction with the server game program 402. Messages can thereby be communicated more quickly, providing for more efficient communication and an improved user experience. Further, the peer-to-peer communication is implemented using the message routing rules at the network interface 441 and other routing nodes, so that communication of messages to different game clients is relatively transparent to game program 442. Accordingly, game program 442 can communicate in a peer-to-peer fashion without extensive modification of the program.

This configuration allows for messages associated with different software applications, or different portions of a software application, to be routed via a peer-to-peer connection or via a server-client connection, depending on the application. For example, in some network games, the game program itself includes a chat portion, where game participants can send text or voice chat messages to other participants. These chat messages typically do not impact the game play itself. Accordingly, network interface 441 can route chat messages in a peer-to-peer fashion, while routing messages associated with game events (e.g. firing a weapon, moving a character, and the like) to the server game program 402 for processing. This allows the server game program 402 to process only those messages that impact the game play itself, improving communication bandwidth between the server game program 402 and the game participants.

Figure 5:
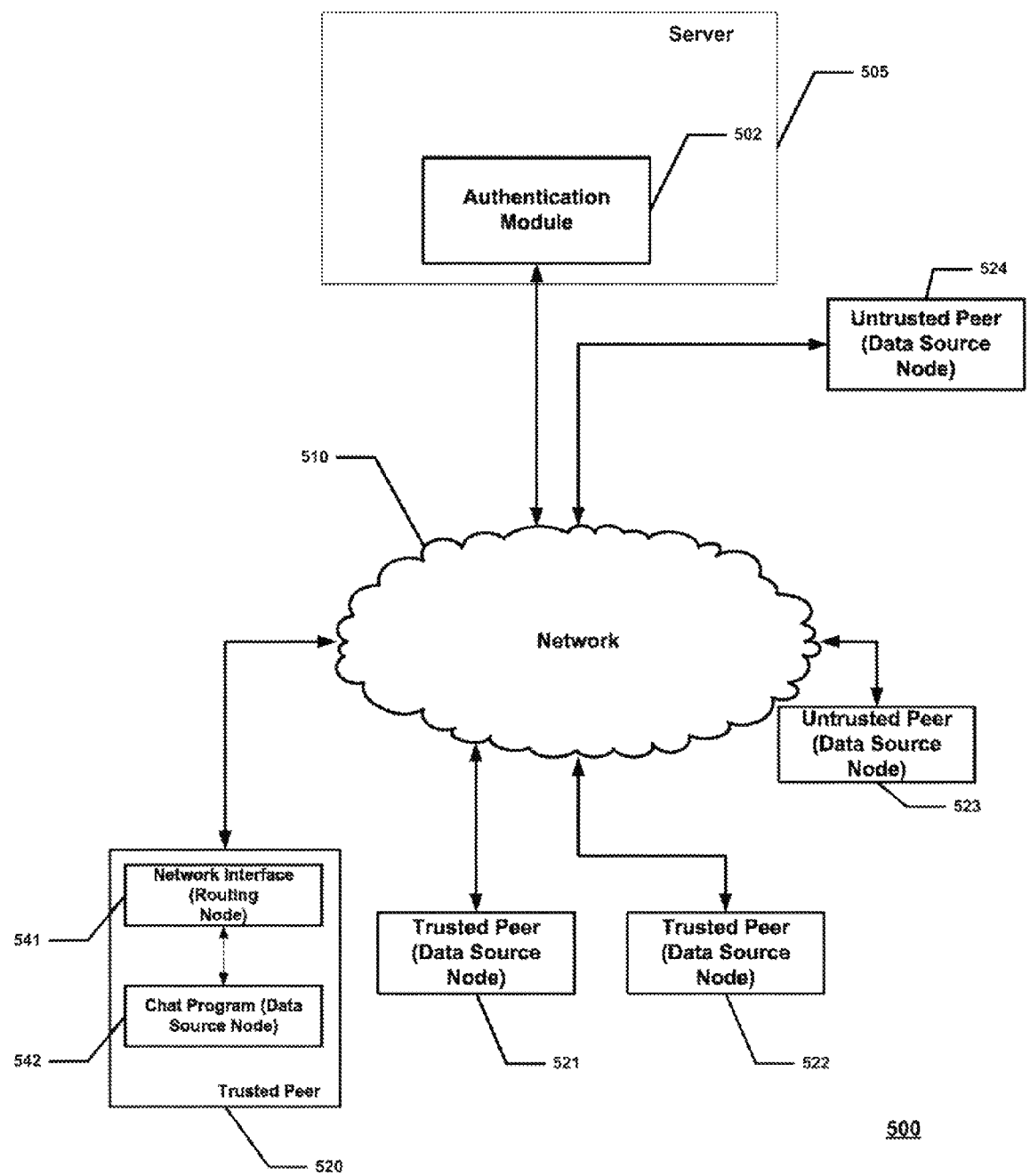
FIG. 5 is a block diagram of a particular embodiment of a communications network implement a peer-to-peer chat program in accordance with one embodiment of the present disclosure.

Referring to FIG. 5, a particular embodiment of a communication network 500 implementing a peer-to-peer chat program is illustrated. The communication network 500 includes a server 505, and peer devices 520-524, each connected to a network 510. The server 505 includes a peer authentication module that is configured as an authority node. Peer device 520 is a computer device, such as a cell phone, desktop or laptop computer, and the like, that includes a network interface 541 and a chat program 542. The network interface 541 is a network interface card, processor, or other hardware module configured to interface with the network 510. The chat program 542 is a program executing at a processor to interact with the other chat programs at peer devices 521-524 to allow users to chat, via text input, voice input, and the like, with other users. The chat program 542 can be executed at a different processor or other hardware module from the network interface 541. Peer devices 521-524 can each be configured similarly to game client 520.

In the illustrated embodiment of FIG. 5, each of the peer devices 520-524 can be either a trusted peer or an untrusted peer. In particular, each peer device can provide authentication information via the network 510 to the peer authentication module 502. The peer authentication module 502 can perform an authentication procedure to determine if each peer device is a trusted or untrusted peer. A peer can also be untrusted if it provides no authentication information to the peer authentication module 502.

The network interface 541 can be configured as a routing node. In particular, network interface 541 can communicate a request to peer authentication module 502 to be configured as a routing node. In response, s peer authentication module 502 can communicate message routing rules to the network interface 541 so that messages of different types can be routed to different destination nodes. In a particular embodiment, the message routing rules cause the network interface 541 to route messages between trusted peers without routing those messages via peer authentication module 502. Further, the message routing rules can cause messages to be routed to untrusted peers to be routed to peer authentication module 502, so that the module can perform designated security functions, such as encrypting messages, dropping messages, checking message content, and the like. The message routing rules thus establish a security protocol for trusted and untrusted peers without extensive modification of the chat program 542.

Figure 6:
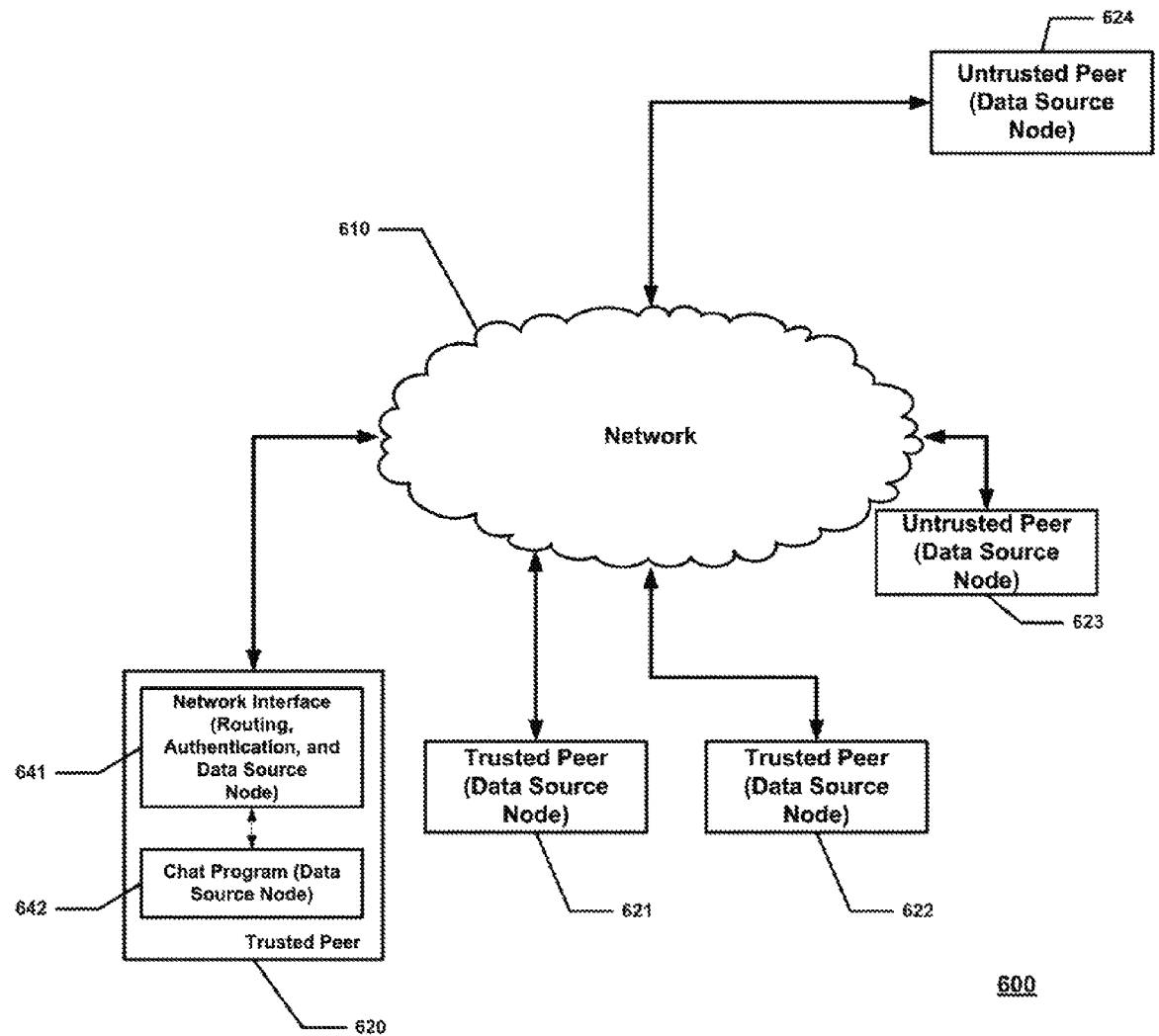
FIG. 6 is a block diagram of a communications network in accordance with another embodiment of the present disclosure.

Referring to FIG. 6, another embodiment of a communication network 600 is illustrated. The communication network 600 is configured similarly to the communication network 500. However, in the communication network 600 the network interface 641 is configured as an authentication node and a data source node, as well as a routing node. Further, in the embodiment of FIG. 6, the network interface 641 is configured to perform an authentication procedure whereby it determines which of the nodes 620-624 are trusted peers. For example, network interface 641 can perform a password authentication procedure, an automated exchange of authentication codes or certificates, or other authentication procedure where it determines which of nodes 620-624 can be designated as trusted nodes or untrusted nodes. Further, network interface 641 can provide message routing rules to routing nodes in the network 610 or at the nodes 621-624 so that all messages of a type associated with an untrusted node are routed to the network interface 641 or other device for processing. Thus, in the illustrated embodiment of FIG. 6, message routing rules are determined and provided to each routing node from a peer in a peer-to-peer network, rather than from a central server or other device.

Figure 7:
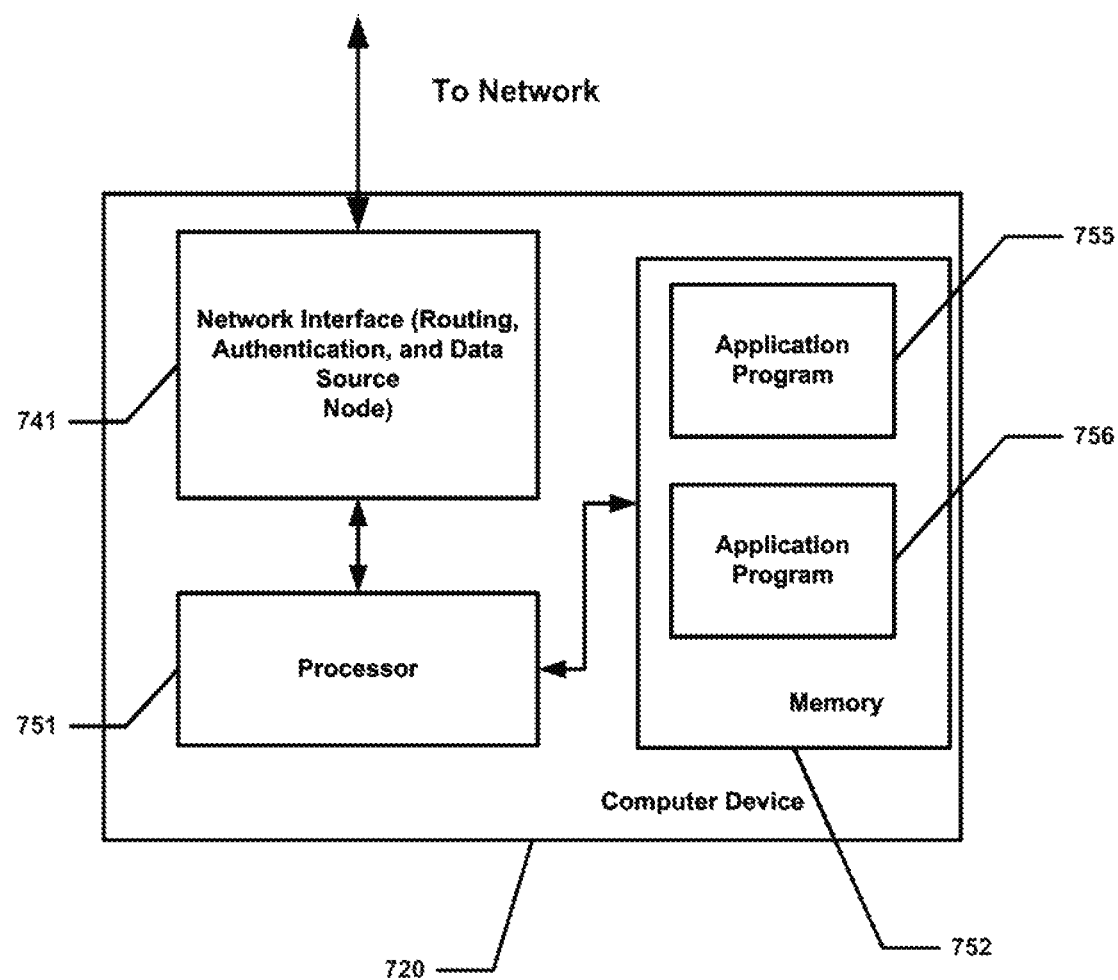
FIG. 7 is a block diagram of a computer device in accordance with one embodiment of the present disclosure.

FIG. 7 illustrates a particular embodiment of a computer device 720, corresponding to a communication node, client device or peer device illustrated at FIGS. 1-6. The computer device 720 includes a processor 751 connected to a network interface device 741 and a memory 752. The memory 752 stores application programs 755 and 756, which are configured to manipulate the processor 751 to perform designated tasks. The network interface device 741 is a device, such as a network interface card, that is configured to provide a physical and logical interface to the network 110. In addition, the network interface is configured as one or more of a routing node, authentication node, and data source node as described with respect to FIGS. 1-7. Thus, in the illustrated embodiment of FIG. 7, the network interface 741 can perform the function of providing a network interface for communications from the processor 751, such as formation of packets and provision of a physical interface for packet communication to the network, and also perform the function of routing messages to different groups of interested nodes based on the message type. The network interface 741 can thereby increase the bandwidth of communications from the processor 751 without extensive modification of the application programs 755 and 756. In another embodiment, the computer device 720 can be a routing node configured to be placed in the network to route messages between data source nodes and between other routing nodes.

Figure 8:
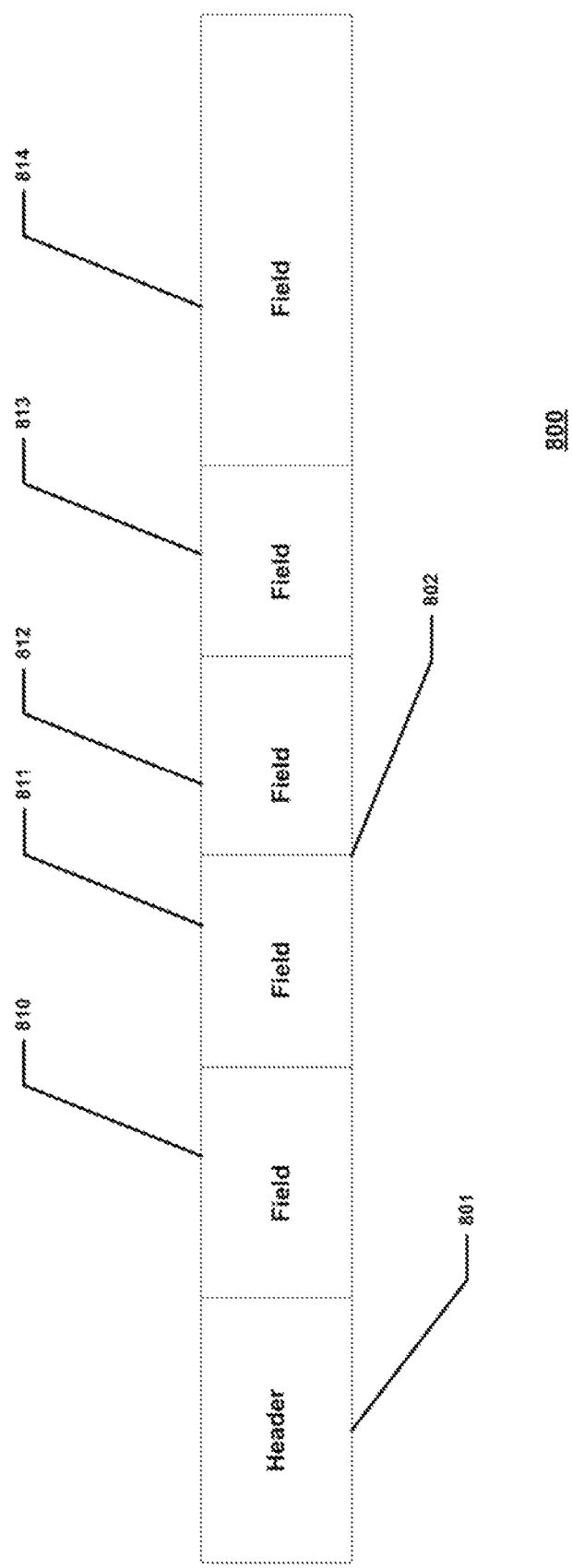
FIG. 8 is a block diagram of a message in accordance with one embodiment of the present disclosure.

Referring to FIG. 8, a block diagram of a particular embodiment of a message 800 is illustrated. The message 800 includes a header 801 and a payload 802. The header 801 includes information describing the communication and routing properties of the message 800. For example, the header 801 can include source and destination addresses associated with the message 800, security and compression information associated with the message 800, information indicating the length of the message 800, and the like. The payload 802 stores information intended for communication to one or more destination nodes by the message source. Accordingly, in some embodiments the payload 802 does not include information, such as address information, that can be used by a router directly to route the message 800.

As illustrated in FIG. 8, the payload 802 includes a plurality of fields, including fields 810, 811, 812, 813, and 814. Each field stores a predefined category or type of information associated with the message 800. For example, if the message 800 is associated with an online game application, field 810 could indicate a character name, field 811 could indicate a character location, and the like. Each field of the message 800 is associated with one or more offsets that indicate the location of the field relative to the header 801. Thus, for example, field 810 could be associated with an offset of "0" indicating that is located immediately after the header 801, while field 813 could be associated with an offset of "3", indicating it is there are three fields between it and the header 801. In an embodiment, the fields in the payload 802 have different sizes. For example, field 810 could store two bytes of information, while field 811 stores 7 bytes of information. Accordingly, in this embodiment the offset associated with each field can be expressed in terms of a number of units of information between the header 801 and a first unit of information of the field. For example, if field 810 includes two bytes of information, then field 811 is associated with a two byte offset relative to the header 801.

In operation a routing node, such as routing node 131, can access the message 800 and determine to which destination nodes the message should be communicated. In particular, the routing node 131 can determine a message routing rule, and an offset associated with that rule. The routing node 131 accesses the field associated with the offset, and compares the information associated at the field to one or more criteria associated with the message routing rule. If the field matches the criteria, the routing node 131 communicates the message 800 to the destination nodes indicated by the rule. This can be better understood with reference to an example.

In this example, it is assumed that the routing node 131 has previously received an instruction describing a message routing rule indicating that, if a message field at offset 3 indicates the message is associated with a clan "PLAYER-CLAN", the message should be routed to nodes 120 and 121. It is further assumed that field 813 of the message 800 indicates that message 800 is associated with "PLAYER-CLAN." In response to receiving the message 800, the routing node 131 compares the field 813 (at offset 3) with the criteria associated with the message routing rule, and determines that the field 813 matches the criteria. Accordingly, the routing node 131 communicates the message 800 to both nodes 120 and 121. If field 131 indicated a different clan, the routing node 131 would not communicate the message 800 to nodes 120 and 121, unless another message routing rule required it to do so. Thus, messages are routed based on payload fields of the message. Further, the inspection of the payload fields and the routing are performed at the routing node 131, relieving the application that generates the message from determining all the destinations of each message. The application can thus operate and communicate more efficiently.

It will be appreciated that message routing rules can incorporate multiple fields and multiple criteria. For example, routing node 131 may route a message to a set of designated destination nodes only if fields 810 and 814 each match different criteria associated with the message routing rule. In addition, routing node 131 can route a message to a different set of designated destination nodes either if field 811 matches a first criterion or field 812 matches a different criterion. Thus, routing node 131 can route a message based on any combination of criteria and fields, based on the message routing rule. In embodiment, the message routing rule is received from another communication node via the same network that communicates the messages.

Message routing rules can be based on any criteria, such as status of an online game character, a particular software application or computer program, a type of security protocol, and the like, or any combination of criteria. Thus, for example, a message routing rule can indicate that a message should be routed to a set of nodes associated with the rule if a portion of the data payload of the message indicates that the message is associated with a particular game character or group of game characters. Another message routing rule can indicate that a message should be routed to a set of nodes associated with the rule if a portion of the data payload of the message indicates that the message has been authenticated by a security program or an authentication node.

In one embodiment, the message routing rule indicates a region, and the message routing rule routes the message to the set of destination nodes associated with the rule only if a field of the message indicates that it is associated with a point in the indicated region. This can be better understood with reference to FIG. 9, which illustrates a region 900 in accordance with one embodiment of the present disclosure. In the illustrated embodiment, it is assumed for purposes of discussion that the region 900 represents a two-dimensional space located within a larger two dimensional space, such as a space associated with an online game. For example, the region 900 can represent a portion of a two-dimensional space located within a larger space of a dungeon, arena, or other game world.

In the illustrated embodiment, the region 900 is defined by a set of points including points 902-906. The points 902-906 can be indicated by coordinates that locate the points in a larger space. In another embodiment, the points 902-906 can be indicated by offsets from an origin, and the origin indicated by coordinates located in the larger space. In the illustrated example, it is assumed that the points 902-906 are associated with a message routing rule. It is further assumed that point 907 represents coordinate information stored in field 813 of message 800. Accordingly, in response to receiving message 800, the routing node 131 can access, based on the message routing rule, the field 813 to determine point 907. The routing node 131 can further determine that point 907 is located within the region defined by points 902-906 and, in response, route the message 800 to destination nodes indicated by the message routing rule. Thus, for example, messages indicating events in an online game may only be routed to destination nodes associated with characters located near the event in the online game space. Further, because this determination is made at the routing node, rather than by the online game application itself, application overhead is reduced and communication bandwidth and efficiency can be improved, thereby improving a user's experience with the game.

It will be appreciated that the regions associated with a message routing rule can be three dimensional, four dimensional regions, or regions having more than 4 dimensions. To ease computation of the intersection of points in space, the region 900 can be described by a regular shape such as a quadrilateral (e.g. a square or rectangle), circle, triangle, sphere, cone, cylinder, and the like. If the region 900 is a regular shape the number of points and lengths needed to describe the region can be relatively small, thereby reducing communication overhead and simplifying the calculations needed to determine if a point associated with a message is inside or outside of the region.

Figure 9:
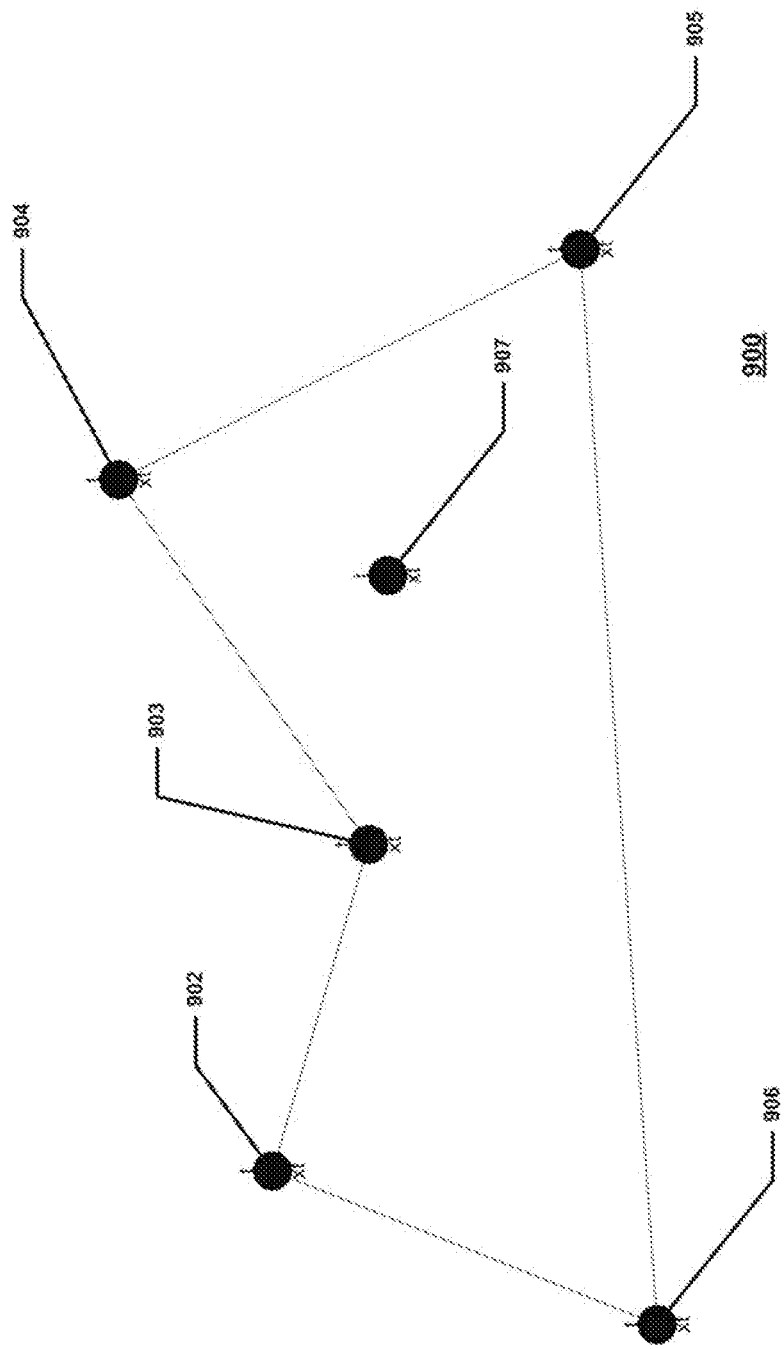
FIG. 9 is a diagram of a region defined by a message field in accordance with one embodiment of the present disclosure.

FIG. 9 can be better understood with reference to an example operation. In the example operation, the region 900 can represent an area of space in a game played over a communication network by multiple players. A message routing rule can be established at a routing node as described above so that messages associated with a player located in the region 900 should only be routed to other players also located within that region. Accordingly, the routing node receives a one or more instructions indicating the players located within the region 900, and one or more instructions indicating a message offset that indicates a player location. These instructions establish a message routing rule at the routing node. In response to receiving a message, the routing node determines whether the message is associated with a player location that is in the region 900. If so, the routing node routes the message to each player also located within the region 900. Thus, the routing node can route messages to particular players based on their location in the game world. The routing node thereby reduces game overhead, because a centralized game server or game program does not have to determine each individual player that is to receive a particular message.

Figure 10:
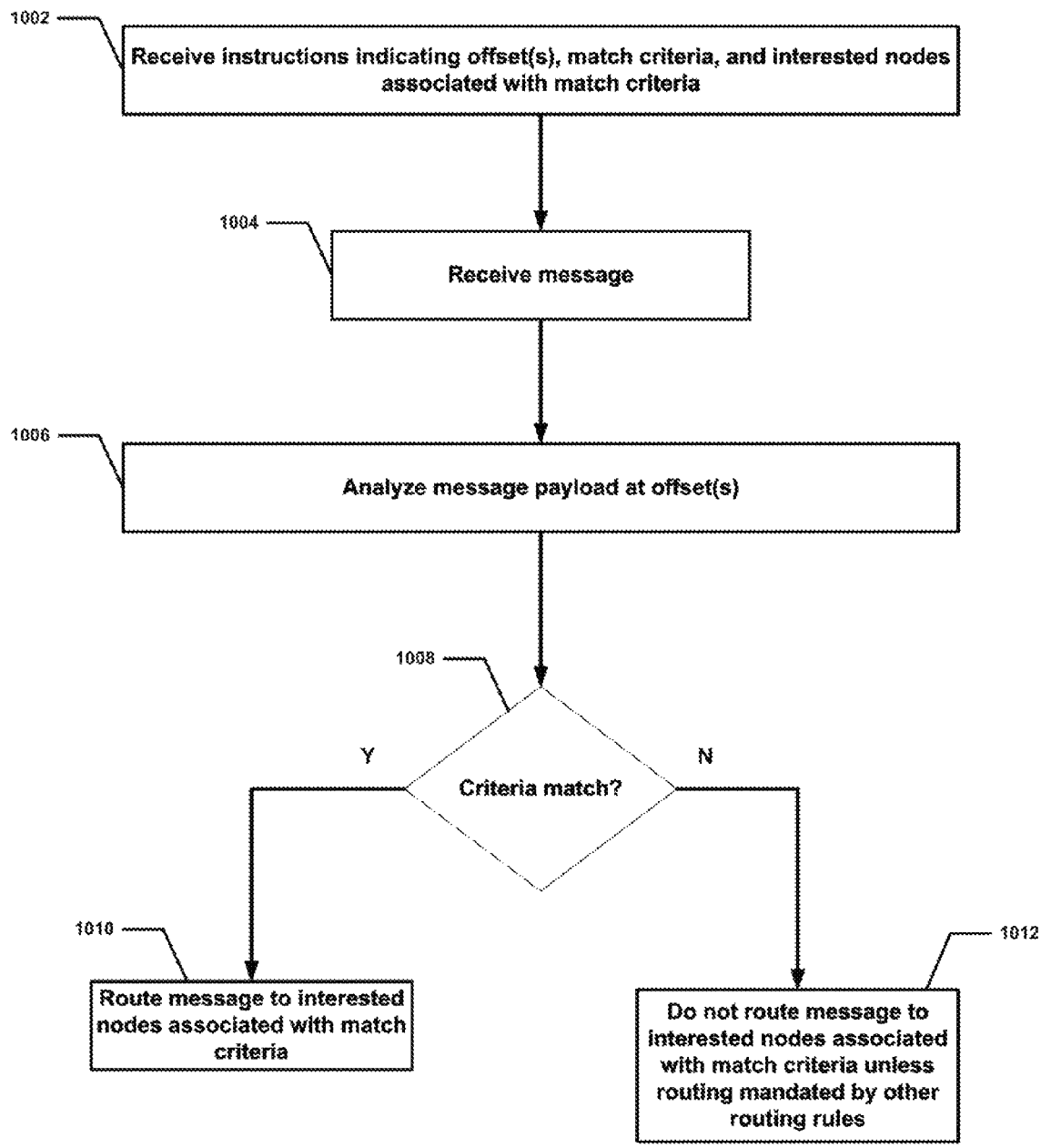
FIG. 10 is a flow diagram of a method of routing a received message in accordance with one embodiment of the present disclosure.

FIG. 10 illustrates a flow diagram of a method of routing a received message in accordance with one embodiment of the present disclosure. At block 1002, a routing node receives an instruction indicating one or more offsets, match criteria associated with each of the one or more offsets, and information indicating the network location of one or more interested nodes of the communication network associated with the match criteria. The instruction can be received from a local processor, from a remote node via the communication network, and the like. At block 1004, the routing node receives a message via the communication network, the message including a header and a data payload. At block 1006, the routing node analyzes one or more portions of the data payload of the received message based on the one or offsets received at block 1002. At block 1008, the routing node determines if the portions of the data payload of the received messages match the match criteria received at block 1002. If so, the method proceeds to block 1010 and routes the received message to each of the interested nodes associated with the match criteria. If not, the method flow proceeds to block 1012 and the routing node does not route the message to each of the interested nodes, unless mandated by other routing rules established by other received instructions.

Further, it will be appreciated that a message could be routed to communication nodes based on the message including location information that is outside a particular region, rather than inside the region.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for message routing in a communication network, the method comprising:
   determining, at a routing node, a first message routing rule for routing messages received at the routing node via the communication network, the first message routing rule indicating a first criterion, a first offset, and a first plurality of destination nodes, the first message routing rule for routing the messages based, at least in part, on comparing the first criterion to information of the messages;
   determining first information included in a payload of a message received at the routing node based, at least in part, on the first offset;
   comparing the first information to the first criterion; and routing the message to each of the first plurality of destination nodes in response to a determination that the first information matches the first criterion, wherein the first criterion comprises a first set of coordinates and the first information comprises a second set of coordinates.

2. The method of claim 1, further comprising:
receiving a first instruction at the routing node from a remote node; and
determining the first message routing rule based, at least in part, on the first instruction.

3. The method of claim 2, further comprising:
receiving a second instruction at the routing node from the remote node; and
determining to add one or more additional destination nodes to the first plurality of destination nodes based, at least in part, on the second instruction.

4. The method of claim 2, further comprising:
receiving a second instruction at the routing node from the remote node; and
determining to remove one or more destination nodes from the first plurality of destination nodes based, at least in part, on the second instruction.

5. The method of claim 1, wherein the payload includes a plurality of message fields, wherein said determining the first information comprises:
determining a message field of the plurality of message fields that is associated with the first offset; and
determining the first information that is included in the message field.

6. The method of claim 1, further comprising:
determining, at the routing node, a second message routing rule indicating a second criterion, a second offset, and a second plurality of destination nodes;
determining second information included in the payload of the message based, at least in part, on the second offset;
comparing the second information to the second criterion; and
routing the message to each of the second plurality of destination nodes in response to a determination that the second information matches the second criterion.

7. The method of claim 6, wherein the payload includes a plurality of message fields, wherein:
said determining the first information comprises:
determining a first message field of the plurality of message fields that is associated with the first offset;
determining the first information that is included in the first message field; and
said determining the second information comprises:
determining a second message field of the plurality of message fields that is associated with the second offset, wherein the second message field is different from the first message field; and
determining the second information that is included in the second message field.

8. The method of claim 1, wherein the first information comprises a first message type associated with the message, and the first criterion comprises a message type criterion associated with the first message routing rule.

9. The method of claim 1, wherein the first set of coordinates defines a two-dimensional space, wherein the second set of coordinates is indicative of a location, and wherein said comparing the first information to the first criterion comprises determining whether the second set of coordinates is located within the two-dimensional space.

10. The method of claim 9, further comprising selecting the first plurality of destination nodes in response to determining that the second set of coordinates is located within the two-dimensional space.

11. The method of claim 9, wherein the first set of coordinates define a polygon selected from a group consisting of: a parallelogram, a circle, and a triangle.

12. The method of claim 9, further comprising selecting the first plurality of destination nodes in response to determining that the second set of coordinates is located outside the two-dimensional space.

13. The method of claim 1, wherein the first set of coordinates defines a three-dimensional space, wherein the second set of coordinates is indicative of a location, and wherein said comparing the first information to the first criterion comprises determining whether the second set of coordinates is located within the three-dimensional space.

14. The method of claim 1, wherein the first information is indicative of a status of a game character or a group of game characters.

15. A method for message routing in a communication network, the method comprising:
determining, at a routing node, a first message routing rule and a second message routing rule for routing messages received at the routing node via the communication network, the first message routing rule indicating a first criterion, a first offset, and a first plurality of destination nodes, and the second message routing rule indicating a second criterion, a second offset, and a second plurality of destination nodes, the first message routing rule and the second message routing rule for routing the messages based, at least in part, on comparing the first criterion and the second criterion to information of the messages;
determining first information included in a payload of a message received at the routing node based, at least in part, on the first offset;
determining second information included in the payload based, at least in part, on the second offset;
comparing the first information to the first criterion;
comparing the second information to the second criterion;
routing the message to each of the first plurality of destination nodes in response to a determination that the first information matches the first criterion; and
routing the message to each of the second plurality of destination nodes in response to a determination that the second information matches the second criterion, wherein the first criterion comprises a first set of coordinates and the first information comprises a second set of coordinates.

16. The method of claim 15, further comprising, in response to determining that the first information matches the first criterion and the second information matches the second criterion, routing the message to each of the first plurality of destination nodes and to each of the second plurality of destination nodes.

17. The method of claim 15, wherein the payload includes a plurality of message fields, wherein:
said determining the first information comprises:
determining a first message field of the plurality of message fields that is associated with the first offset;
determining the first information that is included in the first message field; and
said determining the second information comprises:
determining a second message field of the plurality of message fields that is associated with the second offset, wherein the second message field is different from the first message field; and determining the second information that is included in the second message field.

18. A network device, comprising:

a processor;

a network interface device coupled with the processor, the network interface device configured to:
- determine a first message routing rule for routing messages received at the network device via a communication network, the first message routing rule indicating a first criterion, a first offset, and a first plurality of destination nodes, the first message routing rule for routing the messages based, at least in part, on comparing the first criterion to information of the messages;
- determine first information included in a payload of a message received at the network device based, at least in part, on the first offset;
- compare the first information to the first criterion associated; and
    - route the message to each of the first plurality of destination nodes in response to a determination that the first information matches the first criterion, wherein the first criterion comprises a first set of coordinates and the first information comprises a second set of coordinates.

19. The network device of claim 18, wherein the network interface device is further configured to:
- receive a first instruction from a remote node; and
- determine the first message routing rule based, at least in part, on the first instruction.

20. The network device of claim 19, wherein the network interface device is further configured to:
- receive a second instruction from the remote node; and
- determine to add one or more additional destination nodes to the first plurality of destination nodes based, at least in part, on the second instruction.

21. The network device of claim 19, wherein the network interface device is further configured to:
- receive a second instruction from the remote node; and
- determine to remove one or more destination nodes from the first plurality of destination nodes based, at least in part, on the second instruction.

22. The network device of claim 18, wherein the processor is configured to:
- provide the message to the network interface device; and
- provide the first message routing rule to the network interface device.

23. The network device of claim 18, wherein the payload includes a plurality of message fields, wherein the network interface device configured to determine the first information comprises the network interface device configured to:
- determine a message field of the plurality of message fields that is associated with the first offset; and
- determine the first information that is included in the message field.

24. The network device of claim 18, wherein the network interface device is further configured to:
- determine a second message routing rule indicating a second criterion, a second offset, and a second plurality of destination nodes;
- determine second information included in the payload of the message based, at least in part, on the second offset;
- compare the second information to the second criterion; and
- route the message to each of the second plurality of destination nodes in response to a determination that the second information matches the second criterion.

25. The network device of claim 24, wherein the payload includes a plurality of message fields, wherein:
- the network interface device configured to determine the first information comprises the network interface device configured to:
    - determine a first message field of the plurality of message fields that is associated with the first offset; and
    - determine the first information that is included in the first message field; and
- the network interface device configured to determine the second information comprises the network interface device configured to:
    - determine a second message field of the plurality of message fields that is associated with the second offset, wherein the second message field is different from the first message field; and
    - determine the second information that is included in the second message field.

26. The network device of claim 18, wherein the first information comprises a first message type associated with the message, and the first criterion comprises a message type criterion associated with the first message routing rule.

27. A non-transitory machine-readable storage medium, having instructions stored therein, which when executed by a processor cause the processor to perform operations that comprise:
- determining, at a routing node, a first message routing rule for routing messages received at the routing node via a communication network, the first message routing rule indicating a first criterion, a first offset, and a first plurality of destination nodes, the first message routing rule for routing the messages based, at least in part, on comparing the first criterion to information of the messages;
- determining first information included in a payload of a message received at the routing node based, at least in part, on the first offset;
- comparing the first information to the first criterion;
    - routing the message to each of the first plurality of destination nodes in response to a determination that the first information matches the first criterion, wherein the first criterion comprises a first set of coordinates and the first information comprises a second set of coordinates.

28. The non-transitory machine-readable storage medium of claim 27, wherein the operations further comprise:
- receiving a first instruction at the routing node from a remote node; and
- determining the first message routing rule based, at least in part, on the first instruction.

29. The non-transitory machine-readable storage medium of claim 28, wherein the operations further comprise:
- receiving a second instruction at the routing node from the remote node; and
- determining to add one or more additional destination nodes to the first plurality of destination nodes.

30. The non-transitory machine-readable storage medium of claim 28, wherein the operations further comprise:
- receiving a second instruction at the routing node from the remote node; and
- determining to remove one or more destination nodes from the first plurality of destination nodes based, at least in part, on the second instruction.

31. The non-transitory machine-readable storage medium of claim 27, wherein the payload includes a plurality of message fields, wherein said operation of determining the first information comprises:
  determining a message field included of the plurality of message fields that is associated with the first offset; and
  determining the first information that is included in the message field.

32. The non-transitory machine-readable storage medium of claim 27, wherein the operations further comprise:
  determining, at the routing node, a second message routing rule indicating a second criterion, a second offset, and a second plurality of destination nodes;
  determining second information included in the payload of the message based, at least in part, on the second offset;
  comparing the second information to the second criterion;
    routing the message to each of the second plurality of destination nodes in response to a determination that the second information matches the second criterion.

* * * * *